(12) United States Patent
Kinoshita et al.

(10) Patent No.: US 7,290,042 B2
(45) Date of Patent: Oct. 30, 2007

(54) SERVER APPARATUS AND SYSTEM

(75) Inventors: Yoshiaki Kinoshita, Kanagawa (JP); Kyoko Ikeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 798 days.

(21) Appl. No.: 10/358,204

(22) Filed: Feb. 5, 2003

(65) Prior Publication Data

US 2003/0158896 A1 Aug. 21, 2003

(30) Foreign Application Priority Data

Feb. 7, 2002 (JP) ............................. 2002-030645
Oct. 10, 2002 (JP) ............................. 2002-297179

(51) Int. Cl.
*G06F 15/16* (2006.01)
(52) U.S. Cl. ...................... 709/219; 709/203; 709/229; 709/232; 709/236; 709/246; 345/3.3; 345/600; 382/162; 382/232; 707/101; 707/104.1
(58) Field of Classification Search ................ 709/203, 709/231, 232, 246, 219, 217; 707/101, 104.1; 382/162, 232; 358/448; 345/3.3, 600
See application file for complete search history.

(56) References Cited

U.S. PATENT DOCUMENTS

| | | | | |
|---|---|---|---|---|
| 5,621,660 A * | 4/1997 | Chaddha et al. | ............ | 709/247 |
| 5,953,506 A * | 9/1999 | Kalra et al. | .................. | 709/231 |
| 6,157,735 A * | 12/2000 | Holub | ......................... | 382/167 |
| 6,163,796 A * | 12/2000 | Yokomizo | ................... | 709/203 |
| 6,317,795 B1 * | 11/2001 | Malkin et al. | .............. | 709/246 |
| 6,439,722 B1 * | 8/2002 | Seegers et al. | ............. | 351/243 |
| 6,505,160 B1 * | 1/2003 | Levy et al. | ................. | 704/270 |
| 6,567,531 B1 * | 5/2003 | Kondo et al. | ............... | 382/100 |
| 6,571,279 B1 * | 5/2003 | Herz et al. | ................... | 709/217 |
| 6,671,807 B1 * | 12/2003 | Jaisimha et al. | ............ | 713/193 |
| 6,687,753 B2 * | 2/2004 | Schneider | ................... | 709/235 |
| 6,701,315 B1 * | 3/2004 | Austin | ......................... | 707/10 |
| 6,721,804 B1 * | 4/2004 | Rubin et al. | ................ | 709/246 |
| 6,788,800 B1 * | 9/2004 | Carr et al. | .................. | 382/100 |
| 6,977,661 B1 * | 12/2005 | Stokes et al. | ............... | 345/589 |
| 2002/0052885 A1 * | 5/2002 | Levy | ......................... | 707/200 |

FOREIGN PATENT DOCUMENTS

| | | |
|---|---|---|
| EP | 1162806 A2 * | 12/2001 |
| JP | 10-276294 | 10/1998 |
| JP | 11-008774 | 1/1999 |
| JP | 11-355586 | 12/1999 |

* cited by examiner

*Primary Examiner*—Michael Won
(74) *Attorney, Agent, or Firm*—Sughrue Mion Pllc.

(57) ABSTRACT

The present invention provides a server apparatus, which can fetch image data in a desired state and a system including the server apparatus. In the server apparatus, received designation information is analyzed. When specific profile data is designated by profile designation information, the designated profile data is fetched from profile DB. When "profile data is embedded" is designated by transmission method designation information of the designation information, after the fetched profile data is embedded in the image data and then transmitted to a terminal device. When "conversion is performed by profile" is designated by the transmission method designation information, the image data is subjected to color conversion, resolution conversion, or affine conversion based on the fetched profile data and then transmitted to the terminal device. When "only image" is designated by the transmission method designation information, the image data is directly transmitted to the terminal device.

16 Claims, 10 Drawing Sheets

FIG. 4

```
DESIGNATION INFORMATION INPUT SCREEN

IMAGE ID: [          ]~200

PROFILE SETTING                        204          206
   INPUT:  202A~○ DESIGNATED  [            ]  [REFERENCE]
           202B~● NOT DESIGNATED     204          206
   TARGET:       ○ DESIGNATED  [            ]  [REFERENCE]
           202A ● NOT DESIGNATED
           202B                       204          206
   DEVICE:       ○ DESIGNATED  [            ]  [REFERENCE]
           202A ● NOT DESIGNATED
           202B                       204          206
   PROCESS:      ○ DESIGNATED  [            ]  [REFERENCE]
           202A
           202B ● NOT DESIGNATED

ACQUIRED DATA ○ ONLY IMAGE
           208A
           208B ● PROFILE IS EMBEDDED
           208C ○ CONVERSION IS PERFORMED BY PROFILE

[ACQUIRE]~210        [CANCEL]~212
```

FIG. 5A

DEVICE PROFILE DESIGNATION SCREEN

| SELECTION | ID | PROFILE NAME |
|---|---|---|
| ◉ | 1000001 | PRINTER 1 OF COMPANY A |
| ○ | 1000002 | PRINTER 2 OF COMPANY A |
| ○ | 1000103 | PRINTER 1 OF COMPANY B |
| ○ | 2000001 | PROOFER 1 OF COMPANY A |
| ○ | 2000201 | PROOFER 1 OF COMPANY C |
| ○ | 3000001 | MONITOR 1 OF COMPANY M |
| ○ | 3000101 | MONITOR 1 OF COMPANY N |

SELECT~234    CANCEL

PROCESS PROFILE DESIGNATION SCREEN

| SELECTION | ID | PROFILE NAME |
|---|---|---|
| ◉ | 2000001 | RESOLUTION CONVERSION (HALVED) |
| ○ | 2000002 | RESOLUTION CONVERSION (DOUBLED) |
| ○ | 2000101 | AFFINE CONVERSION (CLOCKWISE ROTATION OF 90°) |
| ○ | 2000102 | AFFINE CONVERSION (CLOCKWISE ROTATION OF 180°) |
| ○ | 2000103 | AFFINE CONVERSION (CLOCKWISE ROTATION OF 270°) |
| ○ | 2000111 | AFFINE CONVERSION (HALVED) |
| ○ | 2000112 | AFFINE CONVERSION (DOUBLED) |

SELECT~234    CANCEL

232

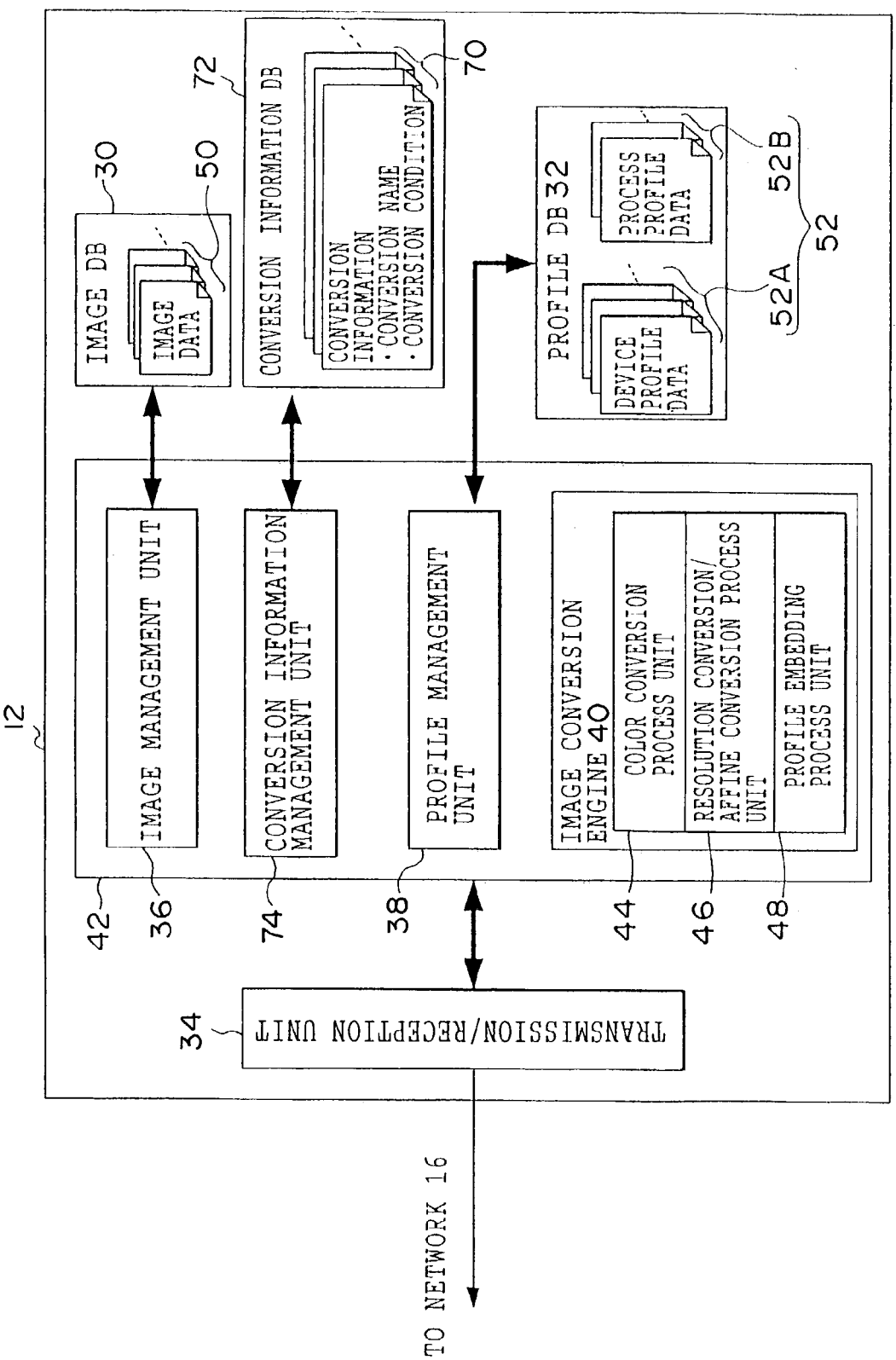

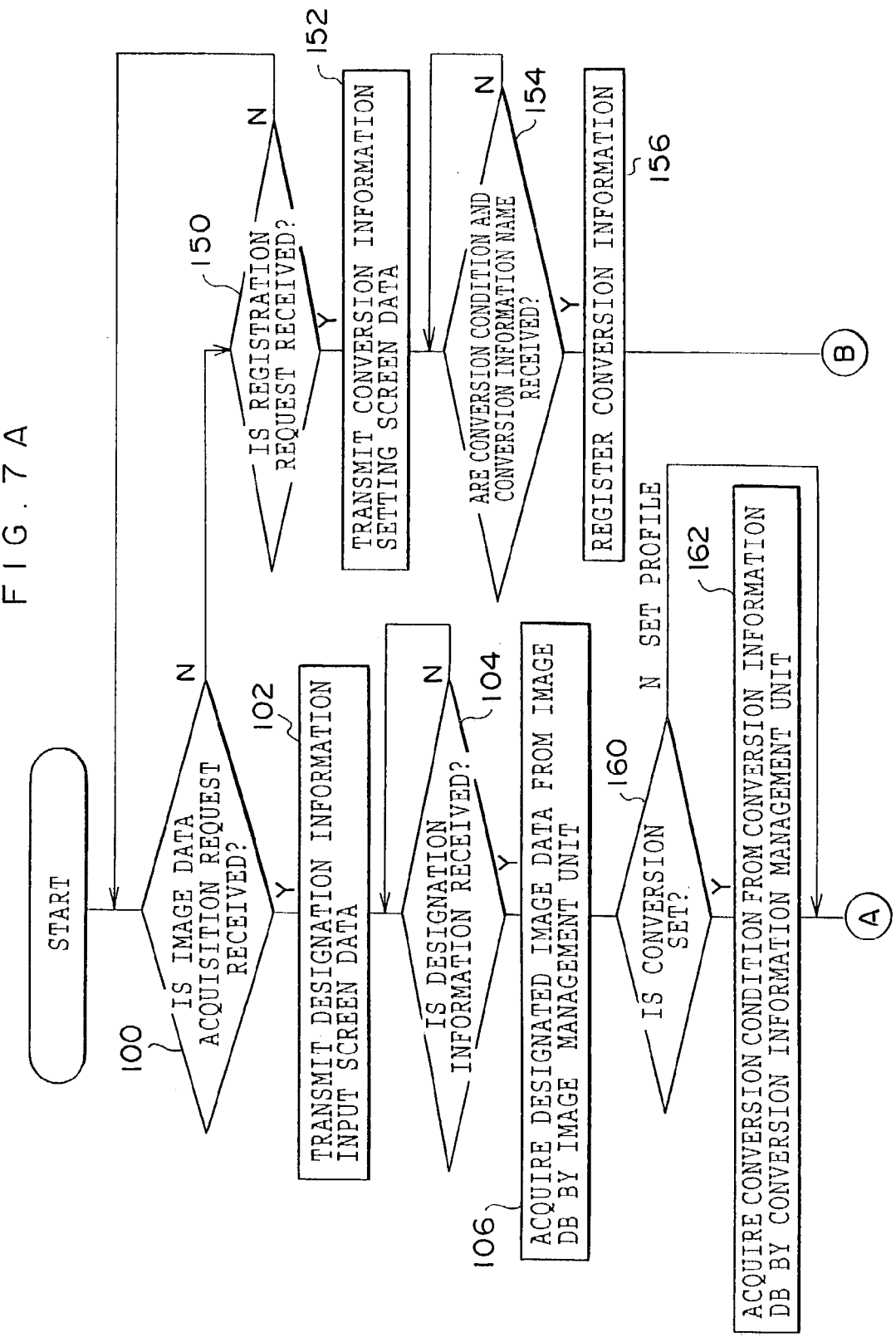

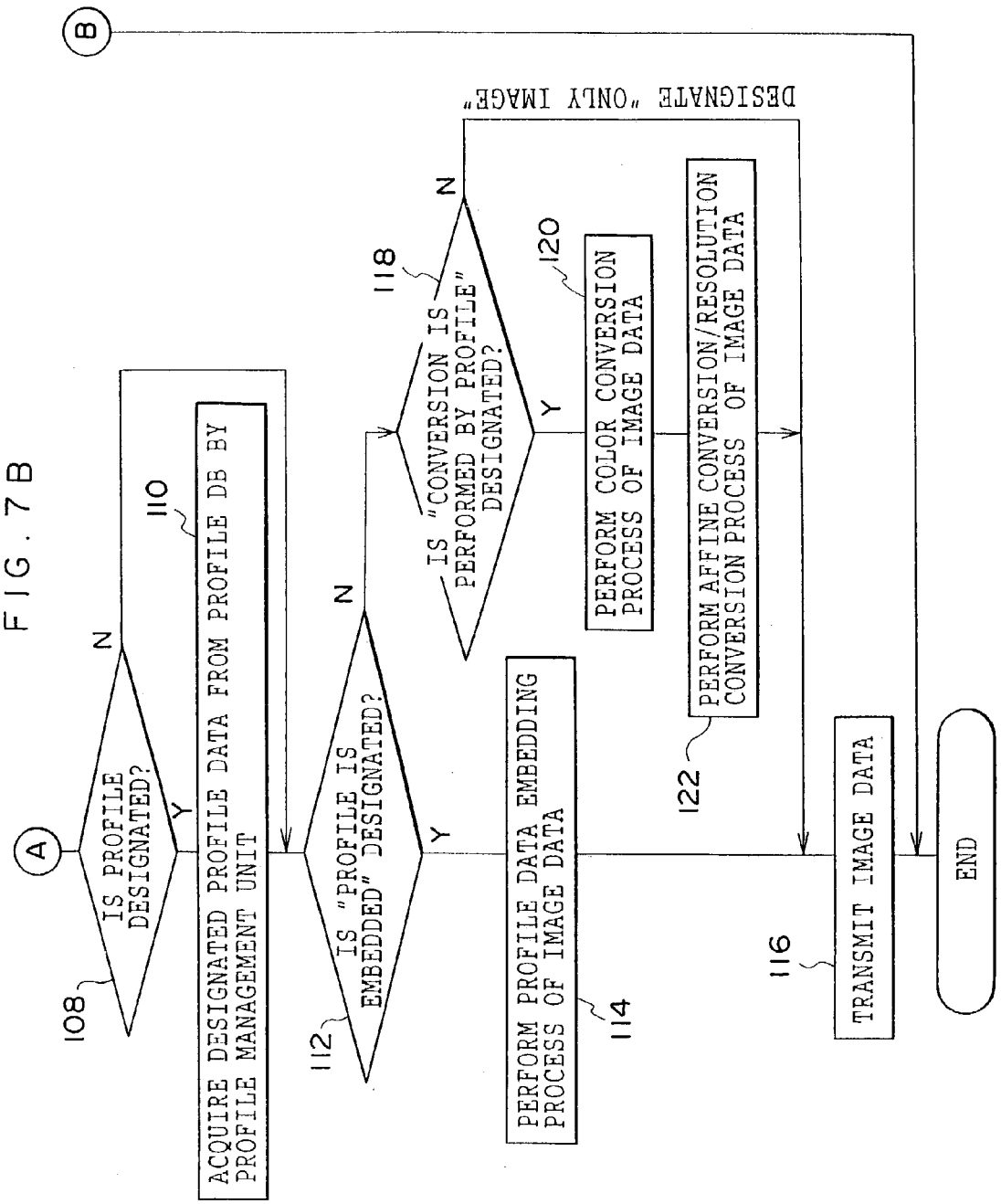

FIG. 8

```
CONVERSION INFORMATION SETTING SCREEN

CONVERSION                        ┌─300
INFORMATION NAME: [            ]

PROFILE SETTING              ┌308    ┌310
    INPUT:  306A─○ DESIGNATED [    ]  [REFERENCE]
            306B─● NOT DESIGNATED
                                   ┌308    ┌310
    TARGET:      ○ DESIGNATED  [    ]  [REFERENCE]
            306A─
            306B─● NOT DESIGNATED
                                   ┌308    ┌310
    DEVICE:      ○ DESIGNATED  [    ]  [REFERENCE]
            306A─● NOT DESIGNATED
            306B                   ┌308    ┌310
    PROCESS:     ○ DESIGNATED  [    ]  [REFERENCE]
            306A─
            306B─● NOT DESIGNATED

ACQUIRED DATA ○ ONLY IMAGE
           312A─
                ● PROFILE IS EMBEDDED
            312B
            312C─○ CONVERSION IS PERFORMED BY PROFILE

[REGISTER]─302         [CANCEL]─304
```

FIG. 9

```
DESIGNATION INFORMATION INPUT SCREEN

IMAGE ID : [_____200_____]

⊙ CONVERSION         _____222_____
    ┊   SETTING  : [                    ▼]
220A
220B
  ○ PROFILE SETTING                    204          206
     INPUT :      ○ DESIGNATED  [_____]  [REFERENCE]
              202A
              202B ⊙ NOT DESIGNATED       204          206
     TARGET :     ○ DESIGNATED  [_____]  [REFERENCE]
              202A
              202B ⊙ NOT DESIGNATED       204          206
     DEVICE :     ○ DESIGNATED  [_____]  [REFERENCE]
              202A
              202B ⊙ NOT DESIGNATED       204          206
     PROCESS:     ○ DESIGNATED  [_____]  [REFERENCE]
              202A
              202B ⊙ NOT DESIGNATED

ACQUIRED DATA  ○ ONLY IMAGE
              208A
              208B ⊙ PROFILE IS EMBEDDED
              208C ○ CONVERSION IS PERFORMED BY PROFILE

[ACQUIRE]—210            [CANCEL]—212
```

SERVER APPARATUS AND SYSTEM

BACKGROUND OF THE INVENTION

1. Field of the Invention

The present invention relates to a server apparatus and a system. More particularly, the present invention relates to: a server apparatus, which communicates, via a network, with a terminal device to transmit image data to the terminal device; and a system, which includes the server apparatus.

2. Description of the Related Art

Conventionally, among server apparatuses used as an apparatus on a network, there is a server apparatus, which is called an image server. The image server accumulates and manages a large amount of image data and, in response to a request from a terminal device connected to the network, transmits requested image data to a terminal device serving as a request source. When the image server is provided on the network, even if a user does not accumulate a large amount of image data at each terminal device, the user can fetch necessary image data from the image server as needed.

In an input device, such as a scanner or a digital camera, for inputting image data and an output device, such as a monitor, a printer, or a proofer for outputting image data, a color image is expressed by a format particular to each device. In order to match colors among these devices, in general, a color conversion process called color matching is performed by using profile data, such as an ICC profile, expressing color expression characteristics of the respective input/output devices.

Therefore, in order to use image data fetched from the image server, for example, when image data obtained by photographing with a digital camera is fetched from the image server and printed by a printer, a color conversion process which color-converts the image data from RGB color system data into CMYK color system data by referring to the respective profile data of the digital camera and the printer, is required. Depending on the circumstances, image processes such as a resolution conversion process, a magnification conversion process, and a rotating process are also performed.

For example, as a technique for performing the color conversion processes, Japanese Patent Application Laid-Open (JP-A) No. 10-276294 discloses the following: various device profiles and color management modules are prepared in a server on a network, the server fetches a device profile and a color management module based on selection information of the device profiles and color management modules input from a terminal and performs a color matching process to input image data, so that color matching is realized in the network system.

However, when conventional techniques are applied to an image server, image data, which has been color-converted, is provided to a user. For this reason, even though the user has provided the various device profile data the server cannot cope with a case in which, for example, the user wants to perform color conversion of the image data by using the device profile data at a terminal side. In addition, the user can perform only color conversion of the image data; resolution conversion, magnification conversion, rotation, and the like must be performed at the terminal side, and the user cannot fetch the image data which can be immediately used.

SUMMARY OF THE INVENTION

The present invention has been made to solve the above problems, and has as its object to provide a server apparatus which can fetch image data in a desired state and a system including the server apparatus.

In order to achieve the above object, according to a first aspect of the invention, there is provided a server apparatus for communicating with a terminal device through a network and transmitting image data to the terminal device, the server apparatus comprising: a reception component for receiving, via network, profile data designation information and transmission method designation information, wherein the profile data designation information is for designating profile data for conversion processing the transmission method, which is selected from one of the following groups (a) converting the image data based on the profile data and sending the converted image data, (b) embedding the profile data in the image data and sending the image data and the embedded profile data, and (c) sending image data, which has neither been converted based on the profile data nor has the profile data embedded therein; an acquisition component for acquiring the profile data designated by the profile data designation information; an embedding component for applying, to the image data, an embedding process, which embeds the profile data acquired by the acquisition component, when the transmission method designation information designates that the profile data is to be embedded in the image data; a conversion component for applying, to the image data, a conversion process based on the profile data acquired by the acquisition component when the transmission method designation information designates that the image data is to be converted based on the profile data and transmitted; and a transmission component for transmitting, via the network, one of the image data embedding processed by the embedding component, the image data conversion processed by the conversion component, and the image data, which was neither embedding processed nor the conversion processed to the terminal device according to the transmission method designated by the transmission method designation information.

According to the first aspect of the invention, the profile data designation information and the transmission method designation information are received by the reception component, and the profile data designated by the received profile data designation information is acquired by the acquisition component. With respect to the profile data, a storage component in which profile data may be stored in advance is arranged in the server apparatus, the acquisition component may acquire profile data designated by the profile data designation information from the storage component, or profile data designated by the profile data designation information may be acquired from another device connected through the network.

When the transmission method designation information, which designates that the profile data is embedded in the image data and transmitted, is received, a process of embedding the profile data acquired by the acquisition component is performed to the image data by the embedding component, and the image data embedded in the profile data is transmitted to the terminal device by the transmission component.

When the transmission method designation information which designates that the image data is converted based on the profile data and transmitted is received, a conversion process based on the profile data acquired by the acquisition component is performed to the image data by the conversion component, and the image data converted based on the profile data is transmitted to the terminal device by the transmission component.

When the transmission method designation information which designates that image data which is not subjected to a conversion process based on profile data and a embedding process of the profile data is transmitted is received, the image data is transmitted to the terminal device by the transmission component without being subjected to the embedding process by the embedding component and the conversion process by the conversion component.

In this manner, in the server apparatus, depending on the transmission method designated by the transmission method designation information, the image data subjected to the embedding process, the image data subjected to the conversion process, or the image data which is not subjected to the embedding process and the conversion process can be selectively transmitted to the terminal device. Therefore, when a user operates the terminal device to transmit profile data designation information which designates desired profile data and transmission method designation information which designates a transmission method such that image data can be fetched in a desired state (state in which the profile data is embedded in the image data/state in which conversion is performed based on the profile data/state in which embedding and conversion are not performed) from the terminal device to the server apparatus through the network, the image data can be fetched from the server apparatus in a desired state.

Designation of profile data and designation of a transmission method by a user need not be performed each time image data is fetched. More specifically, it is made possible to register the profile data designation information and the transmission method designation information received by the server apparatus on the predetermined storage component, and the acquisition component, the embedding component, the conversion component, and the transmission component may be operated with reference to the registered information. In this case, when the user has registered the profile data designation information and the transmission method designation information on the server apparatus side in advance, the user can fetch image data in a desired state by designating only registered information when the image data is fetched.

The profile data may be at least one of device profile data indicating color characteristics of an input/output device for a color conversion process and a process profile data indicating a conversion process except for the color conversion process, and the conversion component may include a first conversion process function for performing a color conversion process and a second conversion process function for performing a conversion process except for the color conversion process. In this manner, not only the color conversion process based on the device profile data but also other conversion processes can be selectively executed.

As described above, the invention has an excellent effect such that image data can be fetched in a desired state.

According to a second aspect of the invention, there is provided a system including: a network, a terminal device, and a server apparatus according to the first aspect which communicates with the terminal device through the network to transmit image data to the terminal device.

According to a third aspect of the invention, there is provided a terminal device which communicates with the server apparatus according to the first aspect through a network to receive image data from the server apparatus, wherein the transmission method designation information is transmitted to a reception component of the server apparatus, and the image data transmitted from a transmission component of the server apparatus is received.

According to a fourth aspect of the invention, there is provided A method for a server apparatus to communicate with a terminal device via a network and transmit image data to the terminal device, the method comprising the steps of: receiving, via the network, profile data designation information and transmission method designation information, wherein the profile data designation information is for designating profile data conversion processing the image data and the transmission method designation information is for designating a transmission method, which is selected from one of the following groups (a) converting the image data based on the profile data and sending the converted image data, (b) embedding the profile data in the image data and sending the image data and the embedded profile data, and (c) sending image data, which has neither been converted based on the profile data nor has the profile data embedded therein; acquiring the profile data designated by the profile data designation information; applying, to the image data, an embedding process embedding the profile data when the transmission method designation method designation information designates that the profile data is to be embedded in the image data; applying, to the image data, a conversion process based on the profile data when the transmission method designation information designates that the image data is to be converted based on the profile data and transmitted; and transmitting, via the network, one of the image data subjected to the embedding process, the data subjected to at least one of the conversion process, the image data which was subjected to neither the embedding process nor the conversion process to the terminal device in accordance with the transmission method designated by the transmission method designation information.

BRIEF DESCRIPTION OF THE DRAWINGS

FIG. 4 is a diagram showing an example of a designation information input screen according to the first embodiment of the present invention.

FIG. 5A is a diagram showing an example of a device profile designation screen.

FIG. 5B is a diagram showing an example of a process profile designation screen.

FIG. 6 is a diagram of a function configuration of a server apparatus according to the second embodiment of the present invention.

FIGS. 7A and 7B are flowcharts of processes executed by the server apparatus according to the second embodiment.

FIG. 8 is a diagram showing an example of a conversion information set screen according to the second embodiment.

FIG. 9 is a diagram showing an example of a designation information input screen according to the second embodiment of the present invention.

DESCRIPTION OF THE PREFERRED EMBODIMENTS

An example of embodiments according to the present invention will be described below in detail with reference to the accompanying drawings.

First Embodiment

[Network Configuration]

Figure 1:
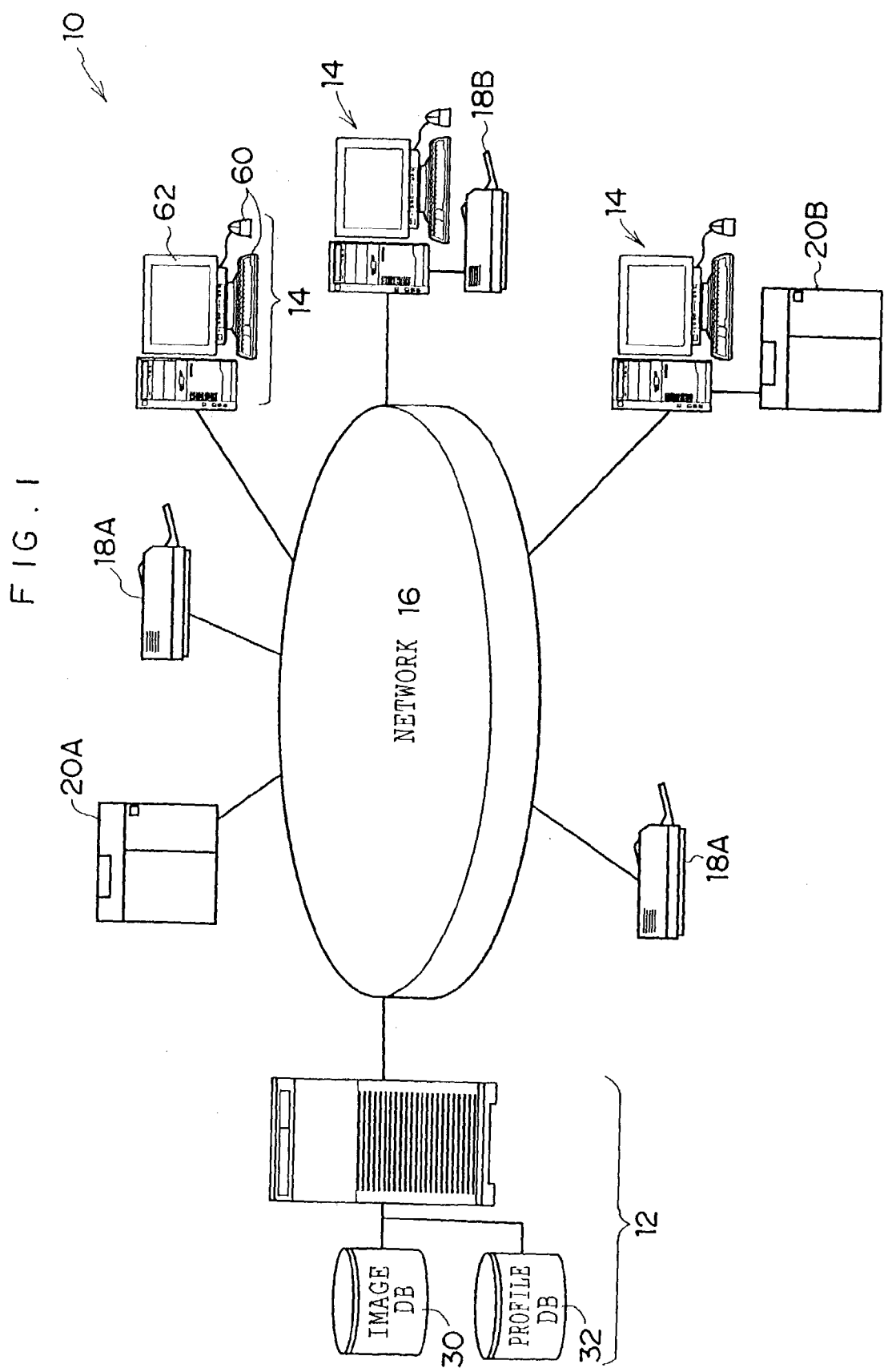
FIG. 1 is a diagram of the configuration of a network system according to the first embodiment of the present invention.

FIG. 1 shows a schematic configuration of a network system according to the first embodiment of the invention. In a network system 10 shown in FIG. 1, a server apparatus 12 to which the invention is applied to provide an image fetching service to a user and a terminal device (client) 14 operated by the user are connected to a network 16 such as a LAN (Local Area Network) through a connection component (not shown) such as a modem, a router, or a TA (Terminal Adapter). The server apparatus 12 and the terminal device (client) 14 can communicate with each other through the network 16.

To the network 16, a printer 18A for printing an image on a sheet of paper based on image data and a proofer 20A for printing a high quality image are also connected through a connection component (not shown). The terminal device 14 transmits a print instruction to the printer 18A and the proofer 20A through the network 16 to make it possible to cause the printer 18A and the proofer 20A to print images.

A printer 18B and a proofer 20B are also directly connected to the terminal device 14 through predetermined cables. Print instructions are transmitted from the terminal device 14 to the printer 18B and the proofer 20B without passing through the network 16 to make it possible to cause the printer 18B and the proofer 20B to print images. In the following description, when the printers 18A and 18B are not particularly distinguished between the alphabets added to the reference numerals for the printers are omitted. Similarly, when the printers 20A and 20B are not particularly distinguished between the alphabets added to the reference numerals for the proofers are omitted.

[Configurations of Devices]

The configurations of the server apparatus 12 and the terminal device 14 will be described below.

The server apparatus 12 comprises, as shown in FIG. 1, a large-capacity database (to be referred to as an "image DB" hereinafter) 30 for storing image data 50 (see FIG. 2) therein and a database (to be referred to as a "profile DB" hereinafter) 32 for storing profile data 52 (see FIG. 2) which is prepared by a manager of the server apparatus 12 in advance therein.

Figure 2:
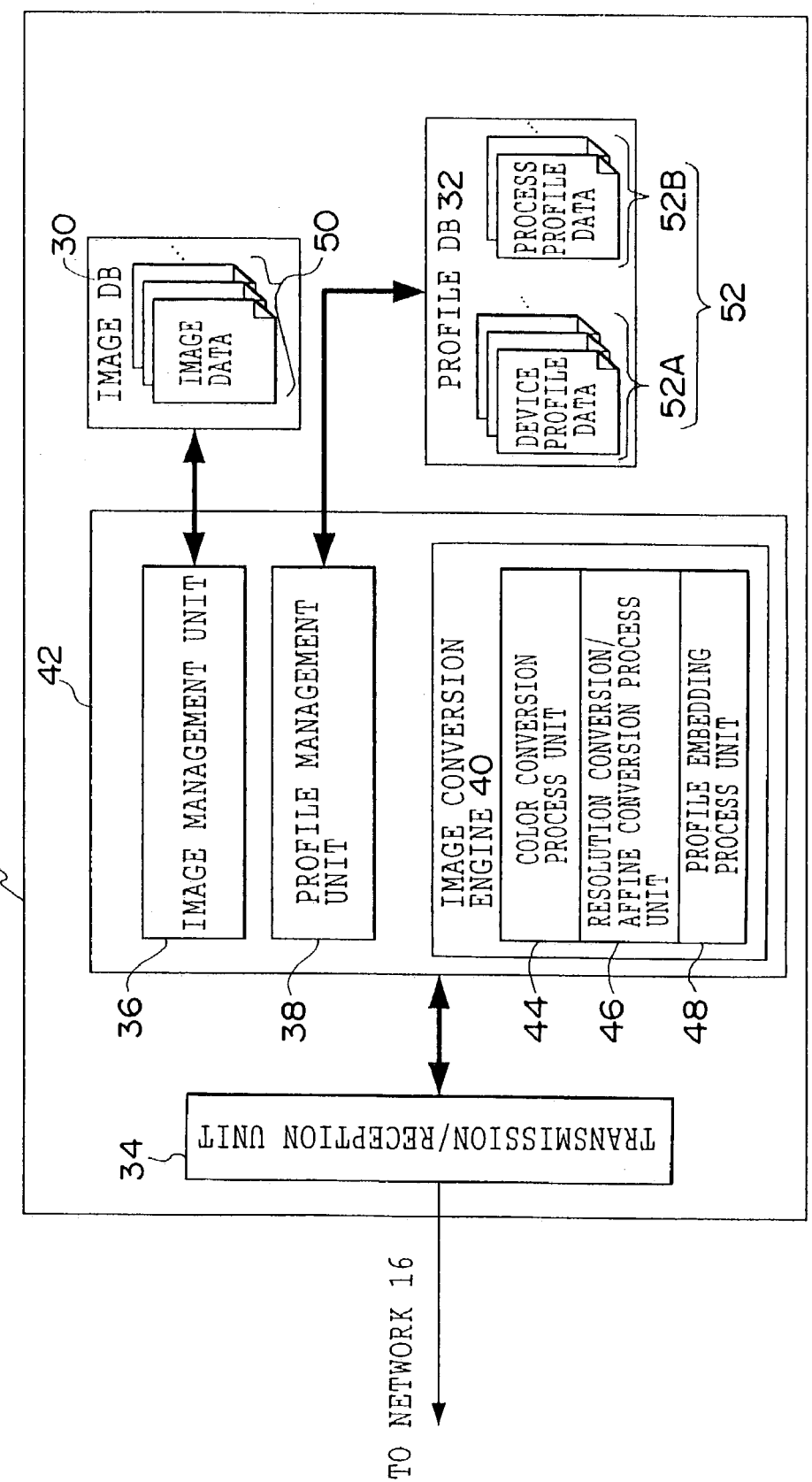
FIG. 2 is a diagram of a function configuration of a server apparatus according to the first embodiment of the present invention.

The profile data 52 stored in the profile DB 32 can be classified into device profile data 52A and the process profile data 52B (see FIG. 2). The device profile data 52A includes files which are prepared for respective devices such as a digital camera, a monitor, a scanner, a printer, and a proofer and in which the characteristics of the color reproducibilities of the devices are described. The process profile data 52B includes files which are prepared for the types of image processings which can be performed to the image data 50 and in which the contents of the image processings are described.

In this embodiment, as an example, a case in which the process profile data 52B of two types for resolution conversion and affine conversion (magnification conversion or rotation) are stored in the profile DB 32 will be described. However, as types of image processings described in the process profile data 52B, in addition to the above types, for example, resolution conversion, affine conversion for performing at least one of magnification conversion and rotation, a filtering process which represents a blurring process, a sharpness process, or a mosaic process and which performs an operation between respective pixels of image data and peripheral pixels to give a special effect to an image, and a tone conversion process for converting a color image into a monochrome image or a sepia image are known.

As a main body of the server apparatus 12, a general server apparatus comprising a CPU, a RAM, a ROM, and the like is used. Only units related to the invention will be described below.

In an internal memory (not shown) of the server apparatus 12, various web data of a homepage for providing an image fetching service and data of various programs related to an image fetching service are stored. The server apparatus 12 causes the CPU to appropriately read and execute these programs, so that functions as shown in FIG. 2 are structured by using hardware resources. FIG. 2 mainly shows the functions related to the invention.

More specifically, in the server apparatus 12, as shown in FIG. 2, a transmission/reception unit 34 serving as a reception component and a transmission component according to the invention which transmits and receives data through the network 16, an image management unit 36 which can access the image DB 30 and which manages the image data 50 stored in the image DB 30, a profile management unit 38 serving as a profile data fetching component according to the invention which can access the profile DB 32 and which manages the profile data 52 stored in the profile DB 32, and an image fetching process unit 42 constituted by an image conversion engine 40 for performing various conversion of the image data 50 are structured.

The transmission/reception unit 34 receives an image data acquisition request transmitted from the terminal device 14 to the server apparatus 12 and various pieces of designation information or the like for acquiring the image data 50 through the network 16, and transmits image data for inputting various pieces of designation information. As needed, device profile designation screen data for designating the device profile data 52A or the process profile data 52B, process profile designation screen data, and the like are transmitted. Based on the image data acquisition request and the various pieces of designation information which are received by the transmission/reception unit 34, the respective unit of the image fetching process units 42 are appropriately operated.

More specifically, the image management unit 36 fetches the image data 50 designated by designation information from the image DB 30. The profile management unit 38 fetches the profile data 52 designated by designation information from the profile DB 32. According to the embodiment, in the image management unit 36 and the profile management unit 38, the image data 50 stored in the image DB 30 and the profile data 52 stored in the image DB 32 are managed such that identification codes are added to the image data 50 and the profile data 52. The IDs are used to designate the image data 50 or the profile data 52.

The image conversion engine 40 comprises a color conversion process unit 44 for performing color conversion of the image data 50 depending on the profile data 52 (device profile data 52A), a resolution conversion/affine conversion process unit 46 for performing resolution conversion or affine conversion of the image data 50 depending on the profile data 52, and a profile embedding process unit 48 for embedding the profile data 52 in the image data 50. More specifically, the color conversion process unit 44 corresponds to a first conversion function, and the resolution conversion/affine conversion process unit 46 corresponds to a second conversion function. The color conversion process unit 44 and the resolution conversion/affine conversion process unit 46 function as the conversion component according to the invention. The profile embedding process unit 48 functions as the embedding component according to the invention.

The image conversion engine 40 appropriately selects the color conversion process unit 44, the resolution conversion/affine conversion process unit 46, and the profile embedding process unit 48 based on designation made by designation information to execute a process, so that the image data 50 picked by the image management unit 36 is converted depending on a transmission method designated by the designation information by using the profile data 52 picked by the profile management unit 38.

Some image conversion engines (especially, a color conversion process unit) must be replaced with another image conversion engine depending on types of output devices (a plurality of engines are required). However, the image conversion engine 40 according to the embodiment can be commonly used without depending on types of output devices. Only one engine is used in the embodiment.

In the transmission/reception unit 34, the image data 50 fetched by the image management unit 36 or the image data 50 converted by the image conversion engine 40 are transmitted to the terminal device 14 through the network 16.

The terminal device 14 comprises, as shown in FIG. 1, an operation input device 60 such as a keyboard, a mouse, or the like for inputting various pieces of information and a monitor 62 for displaying various screens, process results, or the like. More specifically, an image data acquisition request or various pieces of designation information are input from the operation input device 60, and screens based on designation information input screen data, device profile designation screen data, and process profile designation screen data are displayed on the monitor 62. Since the hardware configuration of the terminal device 14 is the same as that of a general terminal device, a description thereof will be omitted.

[Operation]

As an operation of the first embodiment, a flow of an image fetching service provided to a user by the server apparatus 12 will be described below.

When the user uses the image fetching service, the user operates the operation input device 60 of the terminal device 14 to transmit an image data acquisition request to the server apparatus 12.

For example, in a case in which the user operates the operation input device 60 of the terminal device 14 to cause the terminal device 14 to access the server apparatus 12, when the server apparatus 12 is accessed, the server apparatus 12 transmits image data for displaying a list of information (for example, the ID, resolution, size, thumbnail image data, and the like of an image), which expresses each of the image data 50 stored in the image DB 30, to the terminal device 14 via the network 16. In the terminal device 14, a displaying list screen of the image data 50 is displayed on the monitor 62 based on the data. The user checks the presence/absence of her/his desired image data 50 on the displayed list screen. If the desired image data 50 is on the screen, the user operates the operation input device 60 to input the image data acquisition request.

The input image data acquisition request is transmitted to the server apparatus 12 through the network 16. The server apparatus 12 causes the transmission/reception unit 34 to receive the image data acquisition, and executes the processes shown in FIG. 3.

Figure 3:
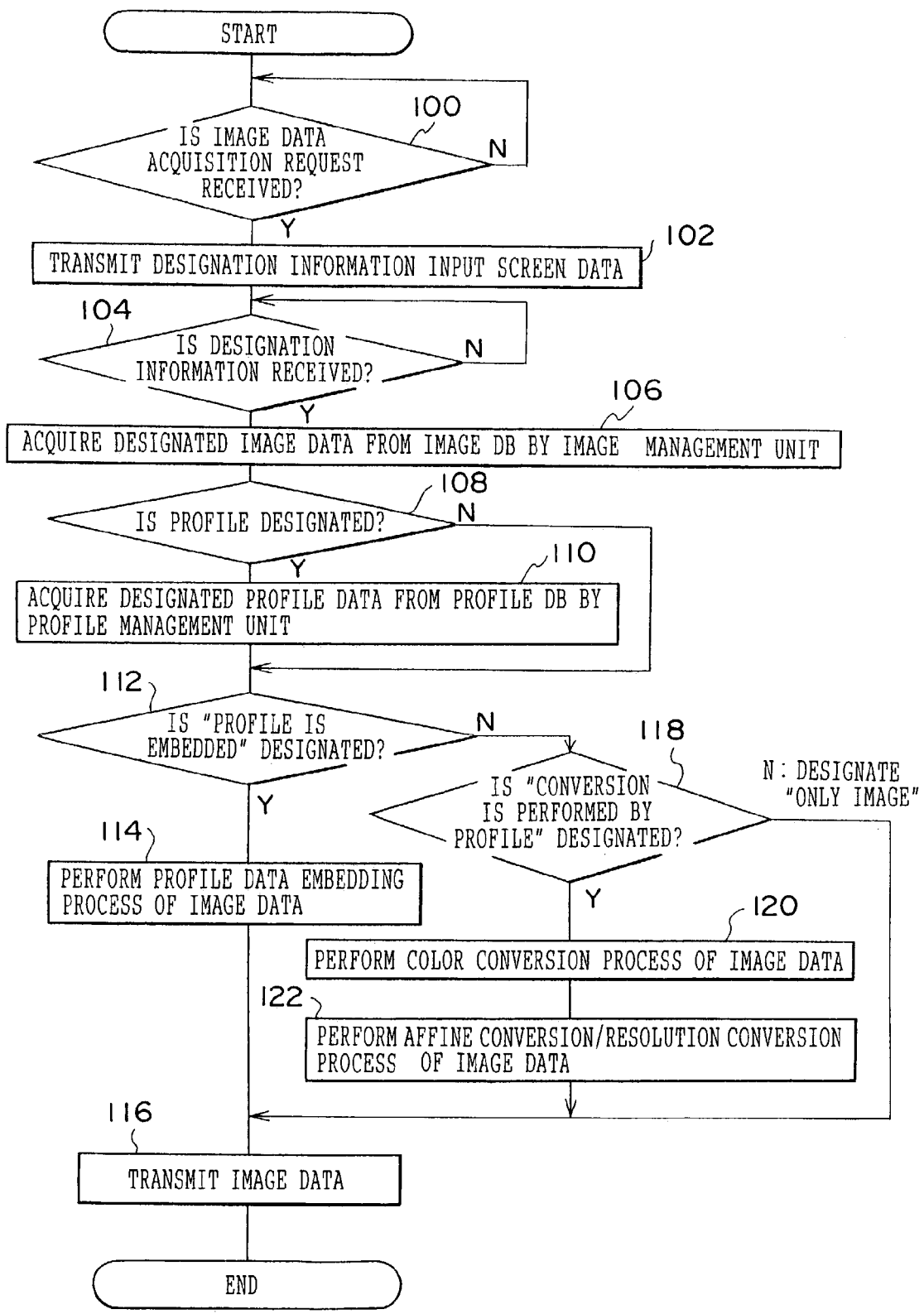
FIG. 3 is a flow chart of processes executed by the server apparatus according to the first embodiment of the present invention.

As shown in FIG. 3, in the server apparatus 12, when the image data acquisition request from the terminal device 14 is received by the transmission/reception unit 34, the server apparatus shifts from step 100 to step 102. In step 102, the designation information input screen data is transmitted from the transmission/reception unit 34 to the terminal device 14 serving as a request transmitting source through the network 16. Thereafter, in step 104, the CPU waits until designation information is received from the terminal device 14.

In the terminal device 14, the designation information input screen data from the server apparatus 12 is received, and a designation information input screen is displayed on the monitor 62. The user operates the operation input device 60 to designate a desired condition on the displayed designation information input screen.

More specifically, in the first embodiment, for example, the designation information input screen as shown in FIG. 4 is displayed on the monitor 62. As shown in FIG. 4, on the designation information input screen, in order to designate desired image data 50, an image ID input column 200 for inputting the ID of the image data 50 is set. On the designation information input screen, in order to designate desired profile data 52 of "input", "target", "device", and "process", a pair of radio buttons 202A and 202B for designating the presence/absence of designation of the profile data 52, a profile ID input column 204 for inputting a profile ID to concretely designate desired profile data when the designation is present, and a "reference" button 206 for referring to a list of the profile data 52 managed by the server apparatus 12 are set.

In this case, the profile data of "input" is device profile data corresponding to an input device of the image data 50. The profile data of "target" is device profile data (generally, profile for performing fine adjustment for a proofer 20) corresponding to an output device for finally outputting the image data 50. The profile data of "device" is device profile data corresponding to an output device, such as the monitor 62 or the printer 18 arranged on the terminal device 14, for outputting the image data 50 (generally outputting the image data 50 for a check before final output). The profile data of "process" is process profile data for performing resolution conversion or affine conversion.

On the designation information input screen, in order to designate a transmission method for the image data 50, radio buttons 208A to 208C are arranged for items of "only image", "profile is embedded", and "conversion is performed by profile", respectively. Any one of the radio buttons can be selected.

The phrase "only image" mentioned here indicates that the image data 50 is directly transmitted to the server 12 without being converted such that a user can acquire the image data which is not changed The phrase "profile is embedded" indicates that the profile data 52 designated for the server 12 by profile setting is embedded in the image data and transmitted such that the user can acquire the image data embedded in the profile data. The "conversion is performed by profile" indicates that color conversion, resolution conversion, affine conversion, and the like of the image data 50 are performed depending on the profile data 52 designated by profile setting and transmitted to the server apparatus 12 such that the user can acquire image data which has been subjected to the processes such as color conversion, resolution conversion, affine conversion, and the like based on the profile data. On the designation information input screen, an "acquisition" button 210 for instructing the terminal device to acquire the image data 50 and a "cancel" button 212 for instructing the terminal device to stop acquisition of the image data 50 are set.

The user operates the operation input device 60, the image ID of desired image data 50 is input to the image ID input column 200 on the designation information input screen displayed on the monitor 62. An input device for the image data 50, an output device for finally outputting the image data 50, an output device for outputting the image data 50 to check the image data 50, if one of the resolution conversion process and affine conversion process is determined, i.e., if the profile data 52 of "input", "target", "device", and "process" include a desired profile data 52, the radio button 202A indicating "designated" is selected from a corresponding one pair of radio buttons 202A and 202B (set in an ON state), and the profile ID of the desired profile data 52 is input to the profile ID input column 204. When the profile data 52 of "input", "target", "device", and "process" do not include specific desired profile data 52, the radio button 202B indicating "not designated" of the corresponding radio buttons 202A and 202B is selected (set in an ON state).

It is assumed that the user selects the radio button 202A indicating "designated". In this case, when the profile ID of the desired profile data 52 and the type of selectable profile data 52 cannot be specified, the user operates the operation input device 60 to select (click) the "reference" button 206.

In this embodiment, in response to the selection of the "reference" button 206, a profile designation screen data request is transmitted from the terminal device 14 to the server apparatus 12. In the server apparatus 12, in response to the profile designation screen data request, image data for designating a device or a process profile stored in the profile DB 32 is generated by the profile management unit 38, so that the image data is transmitted from the transmission/reception unit 34 to the terminal device 14. More specifically, the user selects the "reference" button 206 to make it possible that a device profile designation screen as shown in FIG. 5A or a process profile designation screen shown in FIG. 5B can be displayed on the monitor 62 of the terminal device 14.

The device profile designation screen in FIG. 5A is displayed when the "reference" button 206 corresponding to each of "input", "target", and "device" is selected on the designation information input screen. As a list of selectable device profile data 52A (device profile data 52A stored in the profile DB 32) of the printer, the proofer, the monitor, and the like, a profile ID and a name (profile name) are displayed, and radio buttons 230 are set for the respective device profile data 52A. Only one radio button 230 corresponding to the desired device profile data 52A can be selected.

The process profile designation screen in FIG. 5B is displayed when the "reference" button 206 corresponding to "process" is selected on the designation information input screen. As a list of selectable process profile data 52B, i.e., process profile data 52B stored in the profile DB 32, a profile ID and a name (profile name) are displayed, and radio buttons 232 are arranged for the respective process profile data 52B. More specifically, FIG. 5B shows the following case. That is, as process profile data for resolution conversion, profile data which halves the resolution of an image and profile data which doubles the resolution of an image are included in the profile DB 32. As process profile data for affine conversion, profile data which rotates an image clockwise by 90°, profile data which rotates an image clockwise by 180°, profile data which rotates an image clockwise by 270°, profile data which halves an image size, and profile data which doubles an image size are included in the profile DB 32.

A plurality of radio buttons 232 corresponding to the desired process profile data 52B can be used by the user. However, the selectable profile data 52 are one of the profile data which makes the resolution of an image half and the profile data which makes the resolution of an image twice and one of the profile data which clockwise rotates an image by 90°, the profile data which clockwise rotates an image by 180°, and the profile data which clockwise rotates an image by 270°, and one of the profile data which reduces an image size to half and the profile data which increases an image size to twice.

The magnification, rotation angle, expansion/reduction ratios, and the like of the resolution conversion are not limited to the above numerical values, as a matter of course. In addition, as the magnification, rotation angle, and expansion/reduction ratios of the resolution conversion, a user may be able to input arbitrary values.

The user checks the name of the profile data 52 on the device profile designation screen and the process profile designation screen displayed on the monitor 62, selects a desired profile data 52, selects the radio button 230 or 232 set for the profile data 52, and then selects a "selection" button 234. In response to this, the profile ID of the profile data 52 selected on the device profile designation screen or the process profile designation screen are automatically input to the profile ID input column 204 corresponding to the "reference" button 206 selected on the designation information input screen.

In this manner, when the user designates the desired image data 50 and the desired profile data 52 on the designation information input screen, the user operates the operation input device 60 to select any one of the radio buttons 208A to 208C corresponding to a method of transmitting desired image data. Thereafter, the user selects the "acquisition" button 210 to instruct the terminal device to execute acquisition of the image data 50.

In the terminal device 14, in response to the acquisition execution instruction input, image data designation information (image ID input to the image ID input column 200) indicating the image data 50 designated on the designation information input screen by the user, profile data designation information (selection state of the radio buttons 202A and 202B and profile ID input to the profile ID input column 204) indicating the designated profile data 52, and transmission method designation information (selection state of the radio buttons 208A to 208C) indicating a method of transmitting the designated image data are transmitted to the server apparatus 12 at once as designation information through the network 16.

When the server apparatus 12 causes the transmission/reception unit 34 to receive the designation information transmitted from the terminal device 14 as described above, the server apparatus shifts from step 104 to step 106, and the server apparatus 12 analyzes the received designation information and causes the image management unit 36 to acquire the image data 50 designated by the image data designation information of the designation information from the image DB 30.

When there is a contradiction in the received designation information, it is preferable to prompt the user to re-designate the desired image data by transmitting message data, which prompts re-designation, to the terminal device 14, or the like. An example of a contradiction in the received designation information includes a case in which, even though the radio button 202B indicating "not designated" is selected for all of the items "input", "target", "device", and "processing" and a profile ID is not input into any of the profile ID input columns 204, the radio button 208B or 208C is selected, indicating "profile is embedded" or "conversion is performed by profile" as the image data transmission method.

When the received designation information is analyzed, and when the specific profile data 52 is designated by the profile ID based on the profile designation information, the server apparatus shifts from step 108 to step 110 to acquire the designated profile data 52 from the profile DB 32 by the profile management unit 38, and shifts to step 112. On the other hand, the profile data 52 are not designated, the server apparatus shifts from step 108 to step 112.

In step 112, the received designation information is analyzed. When "profile is embedded" is designated by the transmission method designation information of the designation information, the server apparatus shifts to step 114. In step 114, the profile embedding process unit 48 of the image conversion engine 40 is started to embed the profile data 52 fetched in the step 110 in the image data 50 fetched in the step 106. The server apparatus shifts to step 116 to transmit the image data 50 from the transmission/reception unit 34 to the terminal device 14 through the network 16, and the process is ended. Therefore, in this case, the image data 50 in which the profile data 52 is embedded is transmitted from the server apparatus 12 and received by the terminal device 14.

When "conversion is performed by profile" is designated by the transmission method designation information, the server apparatus shifts from step 112 to step 120 through step 118. In step 120, the color conversion process unit 44 of the image conversion engine 40 is started to perform color conversion of the image data 50 fetched in the step 106 based on the device profile data 52A fetched in the step 110. In following step 122, the resolution conversion/affine conversion process unit 46 is started to perform at least one of the resolution conversion/affine conversion based on the process profile data 52B fetched in step 110 as mentioned above. Thereafter, the server apparatus shifts to step 116 to transmit the image data 50 from the transmission/reception unit 34 to the terminal device 14 through the network 16, and the process is ended. Therefore, in this case, depending on designation by the user, the image data 50 subjected to the color conversion process, the resolution conversion, and the affine conversion is transmitted from the server apparatus 12 and received by the terminal device 14.

The profile data 52 is fetched in step 110. As a result, when the device profile data 52A of the input/output devices are not uniformed, the process in step 120 can be omitted. When the process profile data 52B is not fetched in step 110, the process in step 122 can be omitted.

When "only image" is designated by the transmission method designation information, the server apparatus directly shifts from step 112 to step 116 through step 118, and the image data 50 is transmitted from the transmission/reception unit 34 to the terminal device 14 through the network 16 to end the process. More specifically, in this case, any conversion is not performed, the image data 50 is transmitted from the server apparatus 12 in a state obtained when the image data 50 is fetched from the image DB 30, and received by the terminal device 14. In the invention, handling of the profile data 52 when "only image" is designated is not specifically limited. When the profile data 52 is fetched in step 110, for example, the fetched profile data 52 may be transmitted to the terminal device 14 as a file different from that of the image data 50, or fetching of the profile data 52 may be neglected (any conversion is not performed to the profile data 52).

In the first embodiment, the user can fetch the desired image data 50 from the server apparatus 12 by the image fetching service provided by the server apparatus 12. The image data in any state can be selected from the image data 50 which is not changed, the image data 50 in which designated profile data is embedded, or the image data 50 subject to at least any one of color conversion, resolution conversion, and affine conversion on the designated profile data. More specifically, the user can obtain the image data 50 in a desired state (unchanged state in which embedding or conversion is not performed/state in which profile data is embedded/state in which conversion is performed based on profile data).

In the above description, every time an user fetches desired image data by using the image fetching service provided by the server apparatus 12, designation of a profile and designation of a method of transmitting image data are performed by using the designation information input screen as shown in FIG. 4. However, the invention is not limited to this. Information (to be referred to as conversion information) indicating the conditions (to be referred to as conversion conditions) of the profile and the image data transmission method which are designated by the user is registered, and execution of color conversion, resolution conversion, and affine conversion for the image data, embedding profile data, and the like may be performed with reference to the registered information.

Second Embodiment

A case in which it is made possible to register conversion information will be described below as the second embodiment. The same reference numerals as in the first embodiment denote the same parts in the first embodiment, and a description thereof will be omitted.

The second embodiment is different from the first embodiment in the following points. That is, as shown in FIG. 6, a server apparatus 12 further comprises a database (to be referred to as "conversion information DB" hereinafter) 72 for storing conversion information 70 therein independently of the image DB 30 and the profile DB 32. The function of a conversion information management unit 74 for managing the conversion information 70 stored in the conversion information DB 72 is further structured.

When conversion information indicating a conversion condition designated by a user is received by a transmission/reception unit 34, the conversion information management unit 74 registers the received conversion information on the conversion information DB 72. When the designation information designating the conversion information 70 is received by a transmission/reception unit 34, the conversion information management unit 74 fetches the designated conversion information 70 from the conversion information DB 72. A profile management unit 38 and an image conversion engine 40 can also be operated according to the conversion information 70 fetched by the conversion information management unit 74.

The operation of the second embodiment will be described below with reference to FIGS. 7A and 7B. FIGS. 7A and 7B show flow charts of processes executed by the server apparatus 12 according to the second embodiment.

The same step numbers as in FIG. 3 denote the same processes in FIGS. 7A and 7B, and a description thereof will be omitted.

In the second embodiment, the user can be registered the conversion information 70 indicating a desired conversion condition in the server apparatus 12 in advance prior to the user uses an image data fetching service. When the user wants to register the conversion information 70, the user operates an operation input device 60 of the terminal device 14 to cause the terminal device 14 to access the server apparatus 12 and requests the server apparatus 12 to register conversion information.

When the register of the conversion information is requested by the terminal device 14, the server apparatus 12 shifts from step 100 to step 152 through step 150 as shown in FIGS. 7A and 7B. In step 152, screen data for setting conversion information is transmitted to the terminal device 14. In this embodiment, as an example, a conversion information setting screen shown in FIG. 8 is displayed on a monitor 62 of the terminal device 14.

On the conversion information setting screen shown in FIG. 8, a conversion information name input column 300 for inputting a conversion information name, a "registration" button 302 for instructing the terminal device to perform registration, and a "cancel" button 304 for instructing the terminal device to stop registration are arranged. Similar to the designation information input screen shown in FIG. 4, with respect to "input", "target", "device", and "process", a pair of radio buttons 306A and 306B, a profile ID input column 308, and a "reference" button 310 are set, and radio buttons 312A to 312C for designation of a method of transmitting the image data 50.

In the same way as for the designation information input screen in FIG. 4, when the user designates profile data 52 of "input", "target", "device", and "process" and a method of transmitting the image data 50 by the radio buttons 306A and 306B, the profile ID input column 308, the "reference" button 310, and the radio buttons 312A to 312C and inputs a conversion information name to the conversion information name input column 300, the user selects the "registration" button 302. In this embodiment, in respect to the selection of the "registration" button 302, the terminal device 14 transmits, as conversion conditions, designation results of the profile data 52 of "input", "target", "device", and "process" designated by the user on the conversion information setting screen and the method of transmitting the image data 50 to the server apparatus 12 through the network 16 together with information indicating the conversion information name input to the conversion information name input column 300.

In the server apparatus 12, when the information indicating the conversion conditions and the conversion information name transmitted from the terminal device 14 is received by the transmission/reception unit 34, the server apparatus 12 shifts from step 154 to step 156 as shown in FIGS. 7A and 7B. In the conversion information management unit 74, the conversion information name indicated by the received information is added to the conversion information 70 indicating the received conversion conditions, and the conversion information management unit 74 is registered on the conversion information DB 72.

When the user acquires image data by using the image data fetching service, the user operates the terminal device 14 to cause the terminal device 14 to access the server apparatus 12. As in the first embodiment, an image data acquisition request is transmitted from the terminal device 14 to the server apparatus 12.

In the server apparatus 12, when the image data acquisition request is received from the transmission/reception unit 34, as in the first embodiment, the server apparatus shifts from step 100 to step 102 in FIGS. 7A and 7B to transmit designation information input screen data. However, at this time, in the server apparatus 12 according to the second embodiment, the designation information input screen data is transmitted, as an example, a designation information input screen shown in FIG. 9 is displayed on the monitor 62 of the terminal device 14. The same reference numerals as in the designation information input screen shown in FIG. 4 denote the same parts in FIG. 9, and a description thereof will be omitted.

More specifically, the designation information input screen shown in FIG. 9 is different from the designation input screen shown in FIG. 4 in that a pair of radio buttons 220A and 220B and a conversion information name input column 222 for inputting a conversion information name in conversion setting are set. The radio button 220A is used to select a conversion setting for designating conversion information, and the radio button 220B is used to select a profile setting for designating profile data and an image data transmission method. Any one of the radio buttons 220A and 220B is selected (set in an ON state).

The user operates the operation input device 60 to input the image ID of desired image data 50 to the image ID input column 200 on the designation information input screen displayed on the monitor 62. When the user wants to use the registered conversion information 70, the user selects the radio button 220A (set in an ON state), and inputs the name of desired conversion information to the conversion information name input column 222. In the example shown in FIG. 9, a so-called pull-down form menu is employed as the conversion information name input column 222. When the user operates the operation input device 60 to select a mark "▼" set at the right end part of the conversion information name input column 222, the conversion information name registered by the user is displayed in the menu. The menu display makes it possible that the user check the conversion information name registered on the server apparatus 12 by the user. When the user selects the desired conversion information name from the conversion information names displayed on the menu, the conversion information name selected by the user is automatically input to the conversion information name input column 222. When the conversion information name is input, the user selects the "acquisition" button 210 to instruct the server apparatus to acquire the image data 50.

In the terminal device 14, in response to the acquisition execution instruction input, image data designation information (image ID input to the image ID input column 200) indicating the image data 50 designated by the user on the designation information input screen and conversion information designation information (conversion information name input by the conversion information name input column 222) indicating a conversion setting and indicating the designated conversion information 70 to the server apparatus 12 through the network 16.

On the other hand, when the user wants to designate profile data or an image data transmission method without using the conversion information 70, the user selects the radio button 220B, and, as in the first embodiment, the user designates profile data 52 of "input", "target", "device", and "process" and a method of transmitting the image data 50 by the radio button 202A and 202B, the profile ID input column 204, the "reference" button 206, and the radiobuttons 208A to 208C. The user selects the "acquisition" button 210 to instruct the server apparatus to acquire the image data 50.

In the terminal device 14, in response to the acquisition execution instruction input, image data designation information (image ID input to the image ID input column 200) indicating the image data 50 designated by the user on the designation information input screen and transmission method designation information indicating a profile setting and indicating profile data designation information indicating the designated profile data 52 and a method of transmitting the designated image data are transmitted as designation information to the server apparatus 12 through the network 16.

In the server apparatus 12, when the designation information transmitted from the terminal device 14 is received by the transmission/reception unit 34 as described above, the server apparatus shifts from step 104 to step 106 in FIGS. 7A and 7B to acquire the image data 50 designated by the image data designation information of the designation information from the image DB 30 by the image management unit 36. When the received designation information includes conversion information designation information, the server apparatus determines that the designation information indicates a conversion setting, and the server apparatus shifts from step 160 to step 162. More specifically, when the user selects the radio button 220A on the designation information input screen shown in FIG. 9 to input a conversion information name on the conversion information name input column 222, the server apparatus shifts to step 162. In step 162, the conversion information 70 designated by the conversion information designation information of the received designation information is acquired from the conversion information DB 72. When the server apparatus acquires the conversion information 70, the server apparatus shifts to step 108, and the same processes as in the first embodiments are performed. In this case, the acquired conversion information 70 is analyzed. According to the conversion information 70, acquisition of the profile data 52 by the profile management unit 38 and a conversion process (color conversion process or affine conversion/resolution conversion process) by the image conversion engine 40 is appropriately performed, and the image data 50 is transmitted to the terminal device 14.

On the other hand, when the received designation information includes no conversion information designation information, i.e., when the designation information indicates a conversion setting, the server apparatus directly shifts from step 160 to step 108, and the subsequent processes are the same as those in the first embodiment.

In this manner, in the second embodiment, conversion conditions such as a profile or an image data transmission method can be registered on the server apparatus 12 as the conversion information 70 in advance. When the user wants to receive the image data 50 by the image fetching service of the server apparatus 12, the user can acquire the image data in a desired state (unchanged state in which embedding or conversion is not performed/state in which profile data is embedded/state in which conversion is performed based on profile data) by designating only the registered conversion information 70.

When the user fetches the image data by the image fetching service, as in the designation information setting screen shown in FIG. 9 as an example, a conversion setting and a profile setting are made selectable. In this case, for example, conversion conditions, which are frequently used by the user, are registered as conversion information. Even though conversion conditions, which are used only once, are not registered in advance, the user can perform a profile setting when the image data is fetched. Therefore, the user can enjoy convenience.

The first and second embodiments have described that the server apparatus 12 comprises the image DB 30 and the designated image data 50 is fetched from the image DB 32 by the server apparatus 12 and transmitted to the terminal device 14. However, the invention is not limited to the first and second embodiments. The image DB 30 may be arranged on a network. More specifically, the server apparatus may receive the image data 50 from another apparatus on a network and may perform the same processes as described above to the received image data, and the image data received from the other apparatus may be transmitted to the terminal device 14 in an unchanged state, in a state in which profile data is embedded, or a state in which conversion is performed based on the profile data.

The first and second embodiments have described the case in which the server apparatus 12 comprises the profile DB 32, the designated profile data 52 is fetched from the profile DB 32 by the server apparatus 12, and the profile data 52 is embedded in image data or subjected to a conversion process. However, the invention is not limited to the embodiments, and the profile DB 32 may be arranged on a network. More specifically, in the server apparatus, the designated profile data 52 may be fetched from another apparatus on the network and may be used in the embedding process or the conversion process.

What is claimed is:

1. A server apparatus for communicating with a terminal device through a network and transmitting image data to the terminal device, the server apparatus comprising:
   a reception component for receiving, via network, profile data designation information and transmission method designation information, wherein the profile data designation information is for designating profile data for conversion processing the image data and the transmission method designation information is for designating a transmission method, which is selected from one of the following groups
      (a) converting the image data based on the profile data and sending the converted image data,
      (b) embedding the profile data in the image data and sending the image data and the embedded profile data, and
      (c) sending image data, which has neither been converted based on the profile data nor has the profile data embedded therein;
   an acquisition component for acquiring the profile data designated by the profile data designation information;
   an embedding component for applying, to the image data, an embedding process, which embeds the profile data acquired by the acquisition component, when the transmission method designation information designates that the profile data is to be embedded in the image data;
   a conversion component for applying, to the image data, a conversion process based on the profile data acquired by the acquisition component when the transmission method designation information designates that the image data is to be converted based on the profile data and transmitted; and
   a transmission component for transmitting, via the network, one of the image data embedding processed by the embedding component, the image data conversion processed by the conversion component, and the image data, which was neither embedding processed nor the conversion processed to the terminal device according to the transmission method designated by the transmission method designation information,
wherein the transmission methods of groups a, b and c are all available for selection.

2. The server apparatus of claim 1, wherein
the profile data comprises at least one of device profile data indicating color characteristics of an input/output device for a color conversion process and a process profile data indicating a conversion process other than the color conversion process, and
the conversion component comprises a first conversion process function for performing the color conversion process and a second conversion process function for performing the conversion process other than the color conversion process.

3. The server apparatus of claim 2, wherein the second conversion process function performs at least one of a resolution conversion and an affine conversion.

4. The server apparatus of claim 1, further comprising:
a storage component for storing the profile data designation information and the transmission method designation information;
wherein the acquisition component, the embedding component, the conversion component, and the transmission component perform processes by using the profile data designation information and the transmission method designation information, which are stored in the storage component.

5. The server apparatus of claim 1, further comprising:
a profile database for storing the profile data,
wherein the acquisition component acquires the profile data from the profile database.

6. A system comprising:
a network;
a terminal device; and
the server apparatus of claim 1, which communicates with the terminal device through the network to, transmits image data to the terminal device.

7. The system of claim 6, further comprising:
an input/output device for inputting and outputting the image data, wherein
the profile data comprises at least one of device profile data indicating color characteristics of the input/output device for a color conversion process and process profile data indicating a conversion process other than the color conversion process, and
the conversion component has a first conversion process function for performing the color conversion process and a second conversion process function for performing the conversion process other than the color conversion process.

8. The system of claim 7, wherein the second conversion process function performs at least one of a resolution conversion and an affine conversion.

9. The system of claim 6, further comprising:
a storage component for storing the profile data designation information and the transmission method designation information;
wherein the acquisition component, the embedding component, the conversion component, and the transmission component perform processes by using the profile data designation information and the transmission method designation information, which are stored in the storage component.

10. The system of claim 6. further comprising:
a profile database for storing the profile data wherein the acquisition component acquires the profile data from the profile database.

11. A terminal device for communicating with the server apparatus of claim 1 via a network to receive image data from the server apparatus, wherein
the transmission method designation information is transmitted to a reception component of the server apparatus, and the image data transmitted from a transmission component of the server apparatus is received.

12. A method for a server apparatus to communicate with a terminal device via a network and transmit image data to the terminal device, the method comprising the steps of:
receiving, via the network, profile data designation information and transmission method designation information, wherein the profile data designation information is for designating profile data conversion processing the image data and the transmission method designation information is for designating a transmission method, which is selected from one of the following groups
(a) converting the image data based on the profile data and sending the converted image data,
(b) embedding the profile data in the image data and sending the image data and the embedded profile data, and
(c) sending image data, which has neither been converted based on the profile data nor has the profile data embedded therein;
acquiring the profile data designated by the profile data designation information;
applying, to the image data, an embedding process embedding the profile data when the transmission method designation information designates that the profile data is to be embedded in the image data;
applying, to the image data, a conversion process based on the profile data when the transmission method designation information designates that the image data is to be converted based on the profile data and transmitted; and
transmitting, via the network, one of the image data subjected to the embedding process, the data subjected to at least one of the conversion process, the image data which was subjected to neither the embedding process nor the conversion process to the terminal device in accordance with the transmission method designated by the transmission method designation information
wherein the transmission methods of groups a, b and c are all available for selection.

13. The server apparatus of claim 1, wherein the transmission method is selected by a user.

14. The system of claim 6, wherein the transmission method is selected by a user.

15. The terminal device of claim 11, wherein the transmission method is selected by a user.

16. The method of claim 12, wherein the transmission method is selected by a user.

* * * * *